United States Patent [19]

Numata et al.

[11] Patent Number: 5,523,150

[45] Date of Patent: Jun. 4, 1996

[54] METAL-IMPREGNATED REFRACTORY PRODUCT

[75] Inventors: Noriji Numata; Makoto Iiyama; Noboru Murakami; Motonobu Kobayashi; Haruyoshi Tanabe, all of Tokyo, Japan

[73] Assignee: NKK Corporation, Tokyo, Japan

[21] Appl. No.: 134,473

[22] Filed: Oct. 8, 1993

Related U.S. Application Data

[63] Continuation of Ser. No. 721,557, Aug. 12, 1991, abandoned.

[30] Foreign Application Priority Data

| Jan. 20, 1989 | [JP] | Japan | 1-11619 |
| Jan. 25, 1989 | [JP] | Japan | 1-15516 |
| Jan. 25, 1989 | [JP] | Japan | 1-15517 |
| Jan. 25, 1989 | [JP] | Japan | 1-15518 |
| Mar. 1, 1989 | [JP] | Japan | 1-49429 |
| Mar. 31, 1989 | [JP] | Japan | 1-83622 |
| Mar. 31, 1989 | [JP] | Japan | 1-83623 |
| Apr. 13, 1989 | [JP] | Japan | 1-93619 |
| Apr. 13, 1989 | [JP] | Japan | 1-93620 |
| Jun. 13, 1989 | [JP] | Japan | 1-150197 |
| Sep. 13, 1989 | [JP] | Japan | 1-235824 |
| Sep. 13, 1989 | [JP] | Japan | 1-235825 |

[51] Int. Cl.⁶ .................................................. B32B 5/00

[52] U.S. Cl. .......................... 428/307.7; 428/312.8; 428/472; 428/539.5; 428/614; 428/701; 428/702; 501/110; 501/118

[58] Field of Search ............................ 148/1, 3; 164/80, 164/97, 98; 428/614, 472, 639, 539.5, 306.6, 307.3, 307.7, 701, 702, 312.8; 501/104, 110, 118, 141, 144; 427/376.3, 376.6, 376.7, 314, 369, 398.1, 431, 432

[56] References Cited

U.S. PATENT DOCUMENTS

| 2,399,225 | 4/1946 | Heany | 501/141 |
| 3,718,441 | 2/1973 | Landingham | 428/539.5 |
| 3,828,839 | 8/1974 | Dhingra | 164/97 |
| 3,928,662 | 12/1975 | Kaneko et al. | 427/431 |
| 3,969,553 | 7/1976 | Kondo et al. | 427/431 |
| 4,033,400 | 7/1977 | Gurwell et al. | 164/98 |
| 4,575,439 | 3/1986 | Hintzen et al. | 501/118 |
| 4,726,413 | 2/1988 | Hellebrand et al. | 427/431 |
| 4,828,008 | 5/1989 | White et al. | 164/97 |
| 4,947,924 | 8/1990 | Morita et al. | 164/97 |
| 4,973,566 | 11/1990 | Readey et al. | 501/144 |

FOREIGN PATENT DOCUMENTS

| 49-99512 | 9/1974 | Japan . |
| 57-500788 | 5/1982 | Japan . |
| 60-46988 | 3/1985 | Japan . |
| 60-046988 | 3/1985 | Japan . |
| WO81/03295 | 11/1981 | WIPO . |

*Primary Examiner*—Archene Turner
*Assistant Examiner*—Timothy M. Speer
*Attorney, Agent, or Firm*—Frishauf, Holtz, Goodman & Woodward

[57] ABSTRACT

A metal-impregnated refractory product of this invention has high slag attack, gas attack, and spalling resistances and is used in various types of molten metal treatment vessels. A material of refractory particles mainly consisting of MgO or $Al_2O_3$ is formed and heated by a suitable method to obtain a porous material body containing at least 4 vol % of open pores. A metal or an alloy mainly consisting of at least one type of a metal selected from the group consisting of iron, chromium, and nickel is impregnated in the porous material body at a ratio of 25 vol % or more of the open pores. The metal is filled in pores present in a region from the surface to at least a predetermined depth. The metal-impregnated refractory product can withstand various high-temperature damages and can be stably used over a long time period.

21 Claims, 5 Drawing Sheets

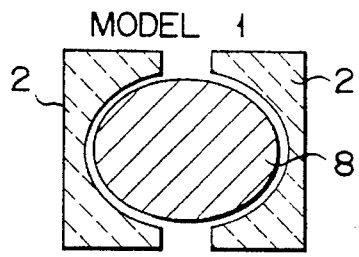
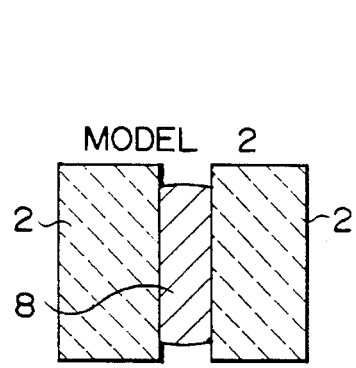
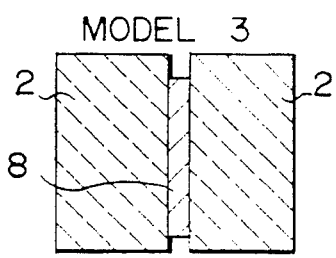
FIG. 1
FIG. 2
FIG. 3
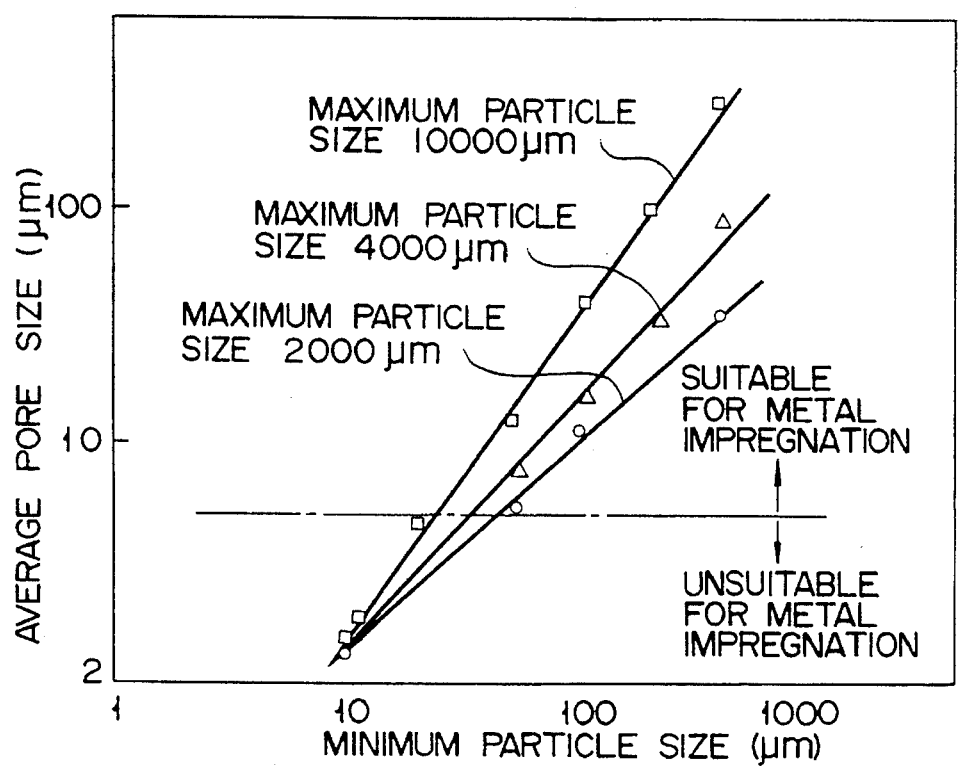
FIG. 4

METAL-IMPREGNATED REFRACTORY PRODUCT

This application is a continuation of application Ser. No. 07/721,557 filed Aug. 12, 1991 now ABN, which is the United States designated application of PCT/JP90/00066 filed Jan. 20, 1990.

FIELD OF THE INVENTION

The present invention relates to a metal-impregnated refractory product for use in various types of molten metal treatment vessels such as a converter, a degassing furnace, and a ladle, and a method of manufacturing the same.

BACKGROUND INFORMATION

Refractory products used in a high-temperature furnace are brought into contact with a molten slag and a molten metal and subjected to various damages. In particular, lining bricks located in a slag line of a vessel can be corroded significantly by molten slag (slag attack) within a short period of time. In addition, the bricks spall after the repetition of a heating/cooling cycle. Graphite-containing refractory products such as magnesia-carbon (MgO-C) brick and a castable containing metal fibers having an improved spalling resistance have been recently put into practical use.

Conventional refractory products improve the slag attack resistance by adding carbon (graphite) in the refractory product or increasing the density of the refractory product, thereby suppressing penetration of the molten slag into the refractory product.

Japanese Patent Registration No. 1401778 discloses a product formed by adding a metal such as aluminum in a carbon-containing refractory product so that the metal, aluminum in the refractory product is preferentially oxidized to prevent high-temperature oxidation of carbon.

Published Unexamined Japanese Patent Application No. 57-500788 discloses a composite body formed by adding a powdered metal to an oxide-based ceramic in order to improve abrasion resistance and toughness of the oxide-based ceramic.

Published Unexamined Japanese Patent Application No. 49-99512 discloses a method of impregnating a metal in a sintered ceramic matrix.

The above conventional refractory products, however, have the following problems in terms of improvements in high-temperature characteristics.

① When the density of a refractory brick is increased, the spalling resistance is generally decreased. Therefore, the brick easily cracks due to a thermal stress.

② A carbon-containing refractory product is significantly damaged at high temperature because the oxide and the contained carbon in the product directly react. Even at low temperature, since the graphite easily oxides, depending on its use atmosphere and temperature are limited.

③ In a carbon-containing refractory product containing carbon and metal aluminum, the contained metal is oxidized within a short time period. Therefore, since oxidation of carbon cannot be sufficiently suppressed, a reduction in slag attack resistance occurs in an initial stage. In this case, the slag attack resistance means a resistance against damage caused by a molten slag which penetrates into the refractory product along open pores and dissolves the refractory product.

Use in a furnace is not contemplated for a conventional metal-impregnated ceramic product. An impregnated metal of the ceramic body flows out at a temperature higher than the melting point of the metal or the ceramic body consists of a composition having a low slag attack resistance, the ceramic body is therefore unsuitable for use in a high-temperature furnace. There are open pores and closed pores in refractory product.

Generally, properties (e.g., slag attack resistance and a spalling resistance) of refractory brick are largely affected by, e.g., amounts, shapes, sizes, and distributions of pores and voids. That is, when the porosity is increased, the brick becomes vulnerable to penetration of a molten slag. To the contrary, when a total amount of pores and voids is decreased to increase the density of a brick, spalling resistance is reduced. Therefore, to improve both the slag attack and Spalling resistances in conventional bricks, an amount of pores must be decreased while that of voids is increased. However, it is generally difficult to manufacture such a refractory product.

The present invention has been made in consideration of the above situation, and has as its object to provide a metal-impregnated refractory product excellent in various high-temperature characteristics, particularly, a slag attack resistance and a gas attack resistance and having a long life, and a method of manufacturing the same.

SUMMARY OF THE INVENTION

The present invention concerns a metal-impregnated refractory product used in direct or indirect contact with molten material and a method of making the same. The refractory product comprises a MgO-based or an $Al_2O_3$-based porous material impregnated with a metal or a metal alloy containing at least one metal selected from the group consisting of iron, chromium, and nickel, the porous material containing at least 4 vol % of open pores and more than 25 vol % of the open pores being impregnated with the metal or alloy.

BRIEF DESCRIPTION OF THE DRAWINGS

FIG. 1 is a cross-sectional view depicting an island-like (knot-like) pore.

FIG. 2 is a cross-sectional view depicting a tubular pore.

FIG. 3 is a cross-sectional view depicting a tubular pore.

FIG. 4 is a graph of average pore size vs. minimum particle size.

DETAILED DESCRIPTION OF THE INVENTION

Figure 5:
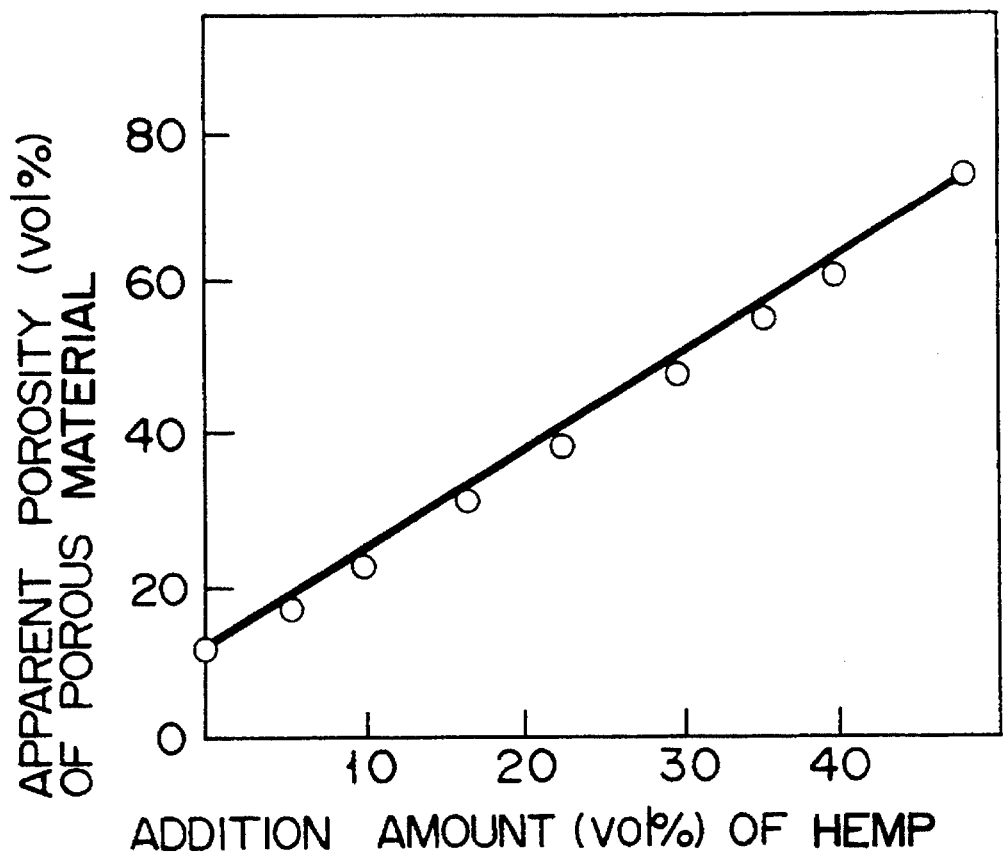
FIG. 5 is a graph of apparent porosity of a magnesia brick mixed with hemp vs. amount of hemp.

The present inventors have made extensive studies on method of improving both a slag attack resistance and spalling resistance of a refractory brick and succeeded in impregnating various types of metals into various porous refractory product. A metal impregnation ratio, an impregnation depth, stability of an impregnated metal, and the like are affected by, e.g., a size, a cell shape, a degassing condition, a pressurization condition, and a preheating temperature of the porous material brick. Especially the shape of pores in the porous material brick is one of important factors having a large effect on the quality of a metal-impregnated refractory product. Therefore, pores contained in the porous material brick must have a shape which allows easy penetration of a molten metal and sufficiently holds the impregnated metal.

When a metal is impregnated into the pores of the porous material brick, penetration of a slag into the refractory product is suppressed, and a reaction between the refractory product and the slag is limited in a portion close to the operation surface. Therefore, a dissolving rate of the refractory product into the slag can be decreased, and no damage is caused by structural spalling generated by penetration of the molten slag. In addition, since the thermal conductivity and the fracture breaking energy of the refractory product are increased, the refractory product becomes stronger against thermal spalling than conventional oxide-based refractory products.

The properties of the metal-impregnated refractory product of the present invention are affected by factors described in items 1 to 5 below.

1. High-temperature characteristics of an impregnating metal.
2. Stability of an impregnated metal into pores.
3. An impregnation ratio of an impregnated metal.
4. Impregnation conditions.
5. The composition of a base refractory product.

The above factors having effects on the properties of the metal-impregnated refractory product will be described below.

1. High-Temperature Characteristics of Impregnating Metal

The effect of an impregnating metal is largely degraded during the use in a high-temperature furnace unless it is present in the form of a metal. For this reason, the metal must have a high oxidation resistance at high temperature.

Even if the metal has a high oxidation resistance, it is slightly oxidized in the vicinity of an operation surface. Therefore, this produced oxide (metal oxide made from an impregnated metal) preferably has a high melting point and does not produce a low-melting compound between said produced oxide and the base oxide (base refractory product).

In addition, since an impregnation treatment must be industrially performed, it is difficult to manufacture a metal-impregnated refractory product by using a metal having a melting point higher than 1,800° C.

For the above reasons, a metal to be used in the present invention was limited to a metal containing at least one of Fe, Ni, and Cr.

2. Stability of Impregnated Metal in Pores

The effect of the metal-impregnated refractory product is largely degraded if an impregnated metal flows out of the pores during the use of the refractory product. The shape of open pores of the brick has a large effect on preventing an outflow of the impregnated metal. A relationship between the pore shape and the stability of the impregnated metal and a method of controlling pores will be described below.

2.1. Relationship Between Pore Shape and Stability of Impregnated Metal

An effect of a pore size on a force of holding an impregnated metal will be described below.

An impregnated metal in a molten state is held in pores by a capillary force. When the molten metal moves out from the pores, the contact angle on the forward side differs from the contact angle on the backward side. A difference is produced in capillary pressures between the forward and backward sides due to this contact angle difference, and the produced pressure difference serves as a moving resistance of the molten metal. This moving resistive force can be a satisfactory holding force when the pore diameter range is 10 mm or less, due to wettability, between such refractory systems as $Al_2O_3$, MgO, and $MgO-Cr_2O_3$ systems refractory and such metals as Fe, Cr, and Ni and the surface tension of each metal.

If the pore size is too small, however, a metal vapor and an atmospheric gas penetrate into pores containing the impregnated metal and replace the metal, and the metal flows out of the pores. According to an experiment, penetration and replacement of a gas occur when a pore size is 10 μm or less. When the pore size is large, i.e., 4 mm or more, a metal frequently outflows due to a force generated upon movement during the impregnation treatment. Therefore, the pore size was set at 10 μm to 3 mm.

The effect of a pore shape on the impregnated metal holding force will be described below.

FIGS. 1 to 3 are views showing models of a pore shape. A model 1 in FIG. 1 shows an island-like (knot-like) pore, in which a knot portion has a size of 10 μm to 3 mm. A model 2 in FIG. 2 shows a tubular pore having a pore size of 10 μm to 3 mm. A model 3 in FIG. 3 shows a tubular pore having a pore size of less than 10 μm.

When the models 1 to 3 are compared with one another, the models 1 and 2 do not easily cause gas penetration/replacement (degassing), while the model 3 easily causes the degassing. In addition, a refractory material 2 of the model 1 has a surface energy per unit mass of an impregnated metal 8 lower than that of the model 2 and moves less easily than the model 2 because the surface energy of a metal 8 is increased upon movement. Therefore, the refractory material 2 of the model 1 has an impregnated metal 8 holding force higher than that of the model 2.

2.2. Controlling Method for Forming Pores

Conventional refractory products generally have 7 to 20 vol % of pores, and many of them have an average pore size of 10 μm or less. Therefore, in order to use such a conventional refractory product as a porous material body for a metal-impregnated refractory product, pores having a pore size of 10 μm to 3 mm must be formed.

As an exception, there is a refractory product originally having an average pore size of 10 μm or more, such as a magnesia-chromium brick. Even in this case, however, pores having a pore size of 10 μm to 3 mm are preferably formed. A method of controlling pores of the porous material body will be described below.

① Method for Obtaining Suitable Pores by Controlling the Size of Material Particles Pore size can be increased by a particle size distribution obtained by removing fine particles from material particles of a porous material. FIG. 4 shows an average pore size as a function of minimum and maximum particle sizes of magnesia bricks burned at 1,750° C. using a sintered magnesia clinker having an MgO particle size of 95 wt % as a material. As is apparent from FIG. 4, when the minimum particle size is 44 μm or more, an average pore size of 8 μm or more, i.e., a pore size suitable for metal impregnation, is obtained. Therefore, the minimum particle size was set at 50 μm or more. As shown in FIG. 4, when the minimum particle size is 80 μm or more, an average pore size of 10 μm or more, i.e., a more preferable pore size, is obtained.

If the maximum particle size is too large, no sufficient strength is obtained in the porous material body, and a distribution of the impregnated metal becomes nonuniform. Therefore, the maximum particle size was set at 10,000 μm or less.

② Method of Controlling Pores by Mixing Thermally Volume-Reducing Particles or Thermally Volume-Reducing Fibers The pore amount and the pore shape of a brick can be controlled by adding thermally volume-reducing particles or thermally volume-reducing fibers, which cause thermal decomposition or reaction upon heating and are reduced in volume, to a raw material at a ratio of 5 to 50 vol %.

In this case, the diameter of the thermally volume-reducing particles or fibers is preferably set within the range of 80 to 10,000 μm. The lower limit of the diameter of the particles or fibers is set at 30 μm because pores having pore sizes large enough to stably hold the impregnated metal cannot be obtained if the diameter is smaller than that. On the other hand, the upper limit of the diameter of the particles or fibers is set at 10,000 μm because, if the diameter is larger than that, an average pore size is increased to reduce the compression strength of a formed product to make it difficult to impregnate a metal and to allow an outflow of the molten metal from the pores. In addition, the length of the mixed fibers is preferably set within the range of 1,000 to 30,000 μm (1 to 30 mm) in order to uniformly mix the fibers into the powder material.

various types of organic fibers can be used as the above fibers. However, it is preferred to use a synthetic fiber or a natural fiber which can cause thermal decomposition even at a baking temperature or a drying temperature as comparatively low temperature as well as a burning temperature as high temperature. Examples of these synthetic or natural fibers are hemp, a vinyl fiber, an acrylic fiber, pulp, and a cotton yarn.

FIG. 5 shows the porosity of a magnesia brick mixed with hemp having a diameter of 500 μm and a length of 3 mm as an example. As is apparent from FIG. 5, the porosity was increased upon mixing of the hemp, and an average pore size was also increased as the mixing amount was increased.

③ Method of Adding Metal Particles

In addition to the control of pores of the brick, the metal diameter obtained after impregnation of a metal can be controlled by mixing 5 to 20 vol % of metal particles having a particle size of 30 to 1,000 μm into the raw material.

The lower limit of the particle size of the metal particles is set at 30 μm because, if metal particles having a particle size smaller than that are mixed, the particle size is decreased to be 10 μm or less due to deformation of the metal particles during forming and burning of the brick, resulting in an insufficient force for holding metal particle in pores. On the other hand, the upper limit of the particle size of the metal particles is set at 10,000 because, if the particle size is larger than that, only the metal particles are sometimes removed from the matrix, therefore a slag attack rate of the matrix accelerates when a slag attack proceeds to expose the metal particles.

In addition, the amount of the metal particles is set at 5 to 20 vol % because no satisfactory addition effect can be obtained if the amount is 5 vol % or less and a formed brick cannot acquire satisfactory sintering strength to make it impossible to perform the metal impregnation treatment if the amount exceeds 20 vol %.

3. Impregnation Ratio of Impregnated Metal

An impregnated metal is preferably, uniformly distributed in a portion of the refractory product brick to be damaged during the use.

Figure 6:
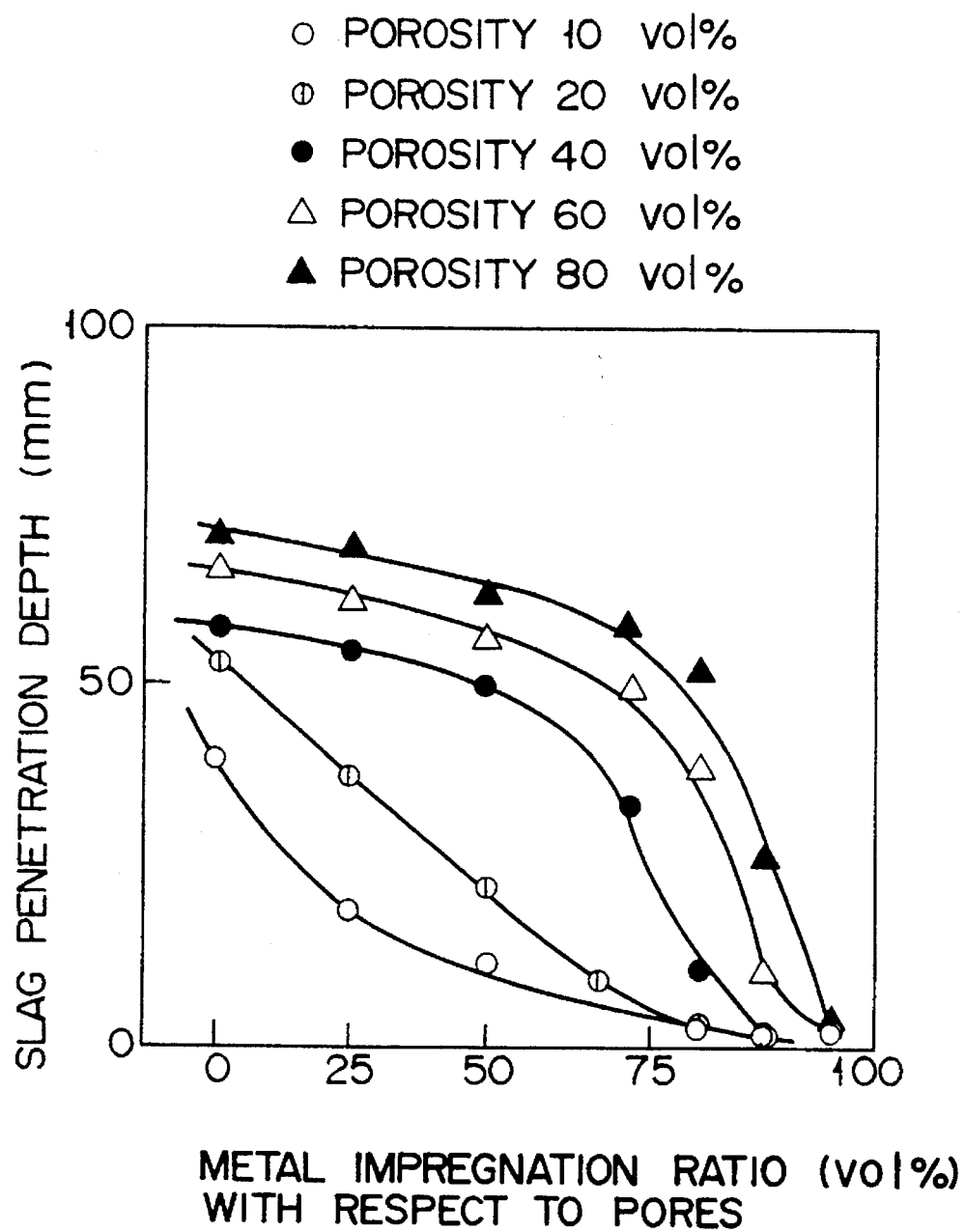
FIG. 6 is a graph of slag penetration depth vs. metal impregnation ratio with respect to pores.
Figure 7:
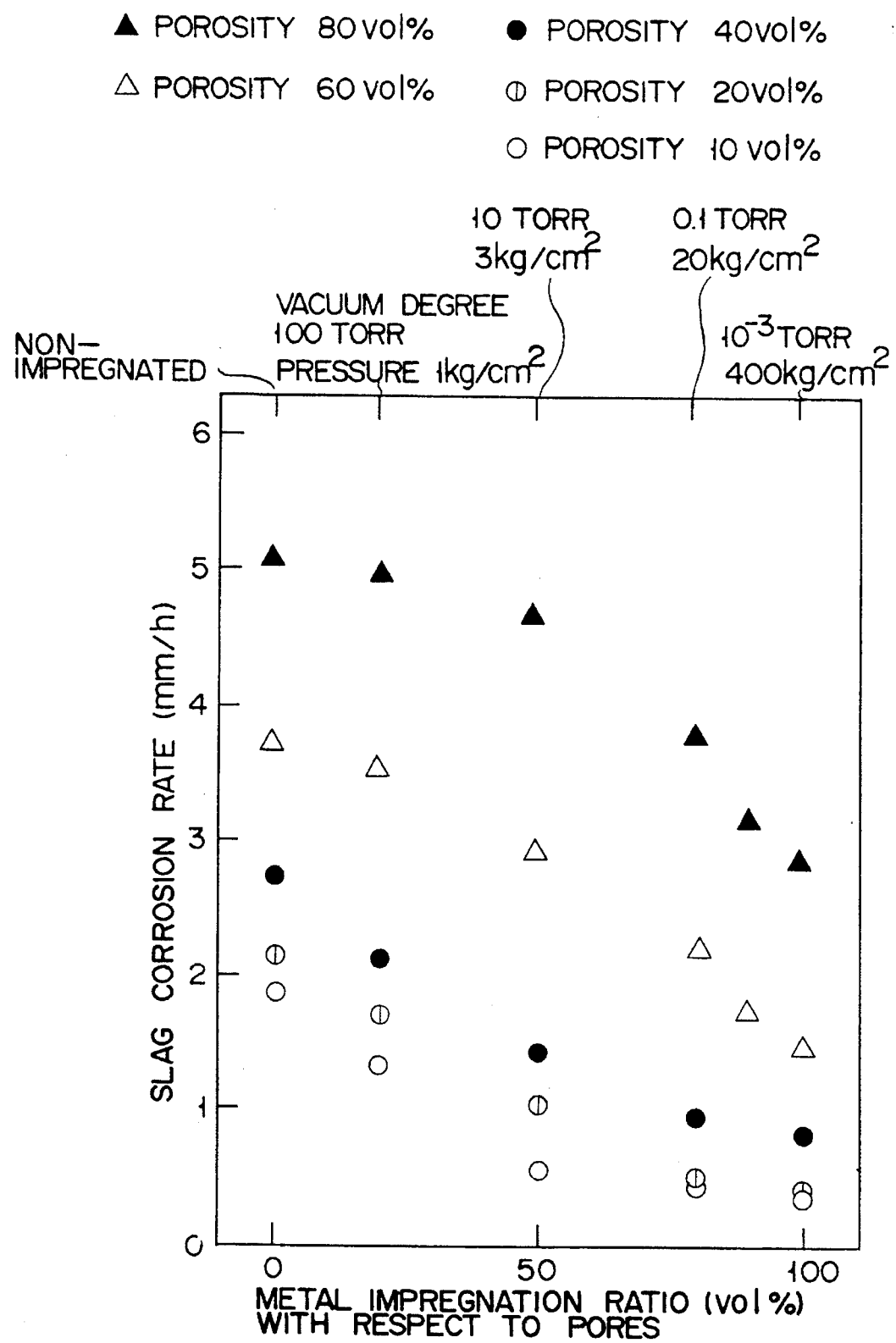
FIG. 7 is a graph of slag corrosion rate vs. metal impregnation ratio with respect to pores.

FIGS. 6 and 7 show a slag penetration depth and a slag attack rate, respectively, obtained by a rotational erosion test for metal-impregnated refractory products fromed by impregnating SUS 304 in magnesia bricks (MgO; 95 wt %) having different porosities and metal impregnation ratios. Both the slag penetration depth and the corrosion speed are reduced upon impregnation of 25 vol % of the SUS 304. As is apparent from FIGS. 6 and 7, as the metal impregnation ratio is increased, the slag penetration depth and the corrosion speed are decreased. Therefore, the metal impregnation ratio is preferably increased.

4. Metal Impregnation Conditions

A method of impregnating a metal in a brick has the following steps (a) to (f).

(a) A heating step for heating a brick up to a temperature of the melting point or higher than a metal to be impregnated.

(b) A degassing step for degassing an internal gas of the brick to 100 Torr or less.

(c) A dipping step for dipping the brick in a molten metal bath at a temperature of 1,500° C. or higher.

(d) A pressurizing step for pressurizing the brick in the molten metal bath up to a predetermined pressure within the range of an absolute pressure of 1 to 100 $kg/cm^2$.

(e) A removing step for removing the brick impregnated with the metal from the molten metal bath.

(f) A slow cooling step for slowly cooling the removed brick.

The vacuum degree of the above degassing step is set at 100 Torr because degassing becomes insufficient at a low vacuum degree exceeding 100 Torr and the molten metal is pushed back by an internal residual gas pressure when the applied pressure is released.

The applied pressure is set at an absolute pressure of 1 to 100 $kg/cm^2$ because at least 1 $kg/cm^2$ is required to impregnate the metal in 25 vol % or more of pores. On the other hand, if the applied pressure 100 $kg/cm^2$, almost no increase is found in the metal impregnation amount.

Figure 8:
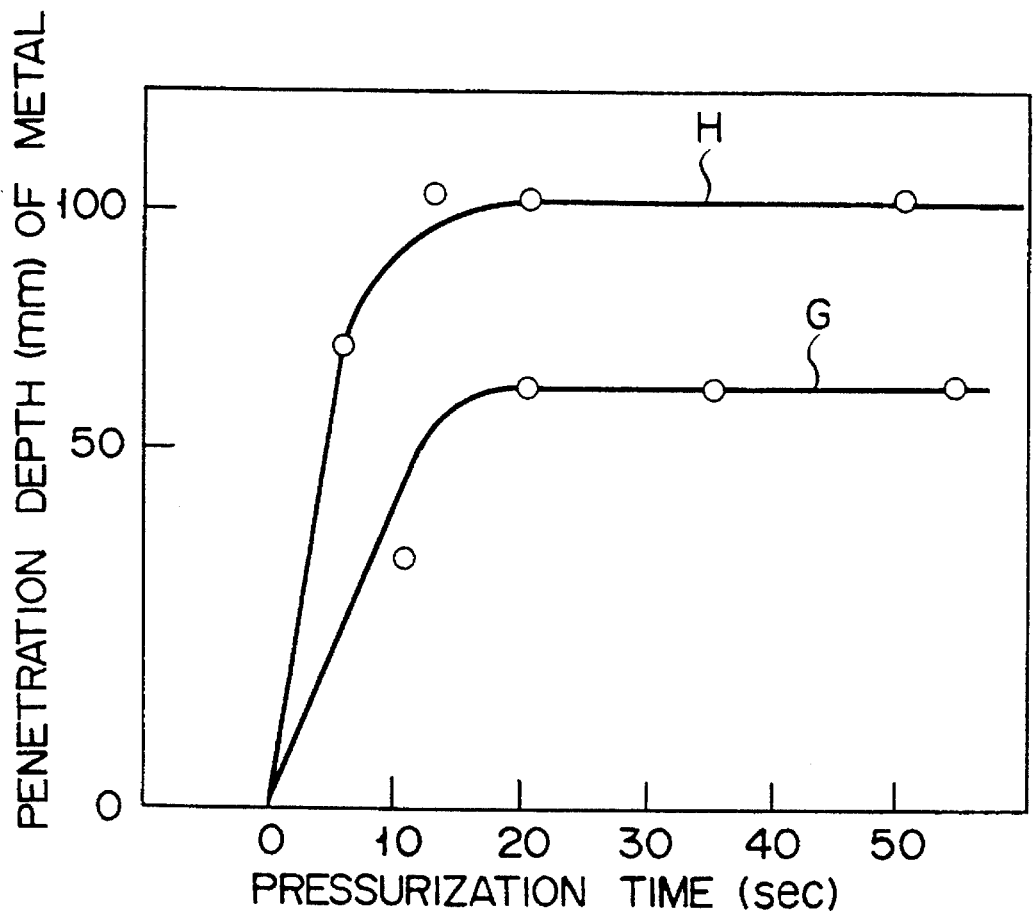
FIG. 8 is a graph of metal penetration depth vs. pressurization time.

FIG. 8 is a graph showing check results of a metal penetration depth obtained by variously changing degassing and pressurization conditions, in which the abscissa indicates a pressurization time and the ordinate indicates the metal penetration depth. Referring to FIG. 8, a curve G indicates a result obtained when a brick was degassed in a furnace at a vacuum degree of 120 Torr and dipped in a molten metal bath at an atmospheric pressure of 10 $kg/cm^2$. A curve H indicates a result obtained when a brick was degassed in a furnace at a vacuum degree of 0.1 Torr and dipped in a molten metal bath at an atmospheric pressure of 10 $kg/cm^2$. Note that the temperature of the molten metal bath was about 1,600° C., and a brick of 200-mm cube was dipped in the bath. As is apparent from FIG. 8, when the degassing condition is set at a vacuum degree of 0.1 Torr, the metal penetration depth reaches a depth of 100 mm or an core after about 10 minutes of a pressurization/dipping treatment. On the contrary, when the degassing condition is set at a vacuum degree of 120 Torr, only a penetration depth of about 85 mm can be obtained, and an internal residual gas amount after the degassing treatment is left non-impregnated. Therefore, the vacuum degree during the degassing treatment is preferably increased up to 0.1 Torr or more.

5. Composition of the Brick

The metal-impregnated refractory product according to the present invention is used in a member which is brought into contact directly or indirectly with a molten product or a dry gas. This metal-impregnated refractory product is characterized by impregnating a metal mainly consisting of iron, chromium, nickel in a brick, which is formed of a refractory substance mainly composed of MgO or $Al_2O_3$ and contains at least 4 vol % of open pores (pores communicating with the surface), at a ratio of 25 vol % or more of the pores.

The content of MgO or $Al_2O_3$ as the main component is preferably 40 wt % or more with respect to the brick before impregnation of the metal. A magnesia system refractory product preferably contains 40 wt % or more of MgO and contains $Al_2O_3$, $Cr_2O_3$, $ZrO_2$, and $SiO_2$ as other components. An alumina system refractory product preferably contains 60 wt % or more of $Al_2O_3$ and contains MgO, $ZrO_2$, and $SiO_2$ as other components. The brick contains a binder agent or a pore controlling agent (e.g., an organic fiber) in addition to the above components.

The atmosphere, the slag component, and the like change in accordance with the type of high-temperature furnace in which the metal-impregnated refractory product is used in the present invention. Therefore, the composition of the brick is important as in-the case of conventional refractory products.

Some of the experiments which lead to the present invention and examples and comparative examples of the present invention will be described below.

Manufacture and Properties of Brick

Tables 1(1) and 1(2) show manufacture examples of a brick of magnesia system, metal impregnation examples, and results of an outflow test of impregnated metal. A sintered magnesia clinker containing 98% of MgO was used as a magnesia material, and a bittern was used as a molding binder. A pressure was set at 1 ton/cm², and the size of the formed block was 150 mm×100 mm×300 mm. As a result, pores having a pore size of 10 μm or more could be formed by any of particle size control of removing fine particles having a particle size of 44 μm or less mixing of thermally volume-reducing particles or fibers, and mixing of metal particles. In addition, as the ratio of pores having a pore size of 10 μm or more was increased, an outflow ratio of an impregnated metal in the outflow test at high temperature was decreased. As a result, a slag resistance and an oxidation resistance of the impregnated metal were improved to realize a large metal impregnating effect.

The same effects as those of the sintered brick were obtained by a non-sintered brick (Example 12) and a cast-molded brick (Example 13). In the molding of Example 12, a binder or a novolak phenol resin was mixed in raw material.

Note that in the erosion test shown in Tables 1(1) and 1(2), a temperature was held at 1,700° C. for four hours, and an eroding agent was replaced every 30 minutes. The eroding agent had a composition of 27 wt % of silica sand, 53 wt % of lime, and 20 wt % of mill scale and was replaced in an amount of 1 kg at a time.

Tables 2(1) and 2(2) show manufacture examples of a brick of alumina system containing 96% of $Al_2O_3$ and a brick of magnesia/chromium system containing 55% of MgO and 32% of $Cr_2O_3$, and metal impregnation examples.

As is the case with the brick of magnesia system porous material body, the metal impregnating effect was enhanced as the ratio of pores having a pore size of 10 μm or more was increased.

The porous material brick of magnesia/chromia system provided a high ratio of pores having a pore size of 10 μm or more and good results even in Example 18 in which the porous material body was manufactured by the same method as that of a conventional refractory product.

Note that in the erosion test shown in Tables 2(1) and 2(2), a temperature was held at 1,700° C. for four hours, and an eroding agent was replaced every 30 minutes. The eroding agent had a composition of 32 wt % of silica sand, 48 wt % of lime, and 20 wt % of mill scale and was replaced in an amount of 1 kg at a time.

Tables 3(1) and 3(2) show a change in impregnation amount obtained in accordance with a vacuum degree and an applied pressure when Fe-18Cr was impregnated in a brick of magnesia system similar to that in said Example 3.

When the vacuum degree was 100 Torr or less, the metal could be impregnated to the core of a porous material body. To obtain a better impregnated refractory product, the vacuum degree is preferably 1 Torr or less.

Even when the applied pressure was increased up to 100kg/cm² or more, no large increase is found in the impregnation amount.

Tables 4(1), 4(2), and 4(3) show results obtained by manufacturing metal-impregnated refractory products consisting of magnesia, spinel, magnesia/chromium, magnesia/dolomite and performing tests using a actual converter and a stainless smelting furnace. Better results than those obtained using conventional MgO-C bricks could be obtained in any of the wall and the tapping member of the converter and the wall of the stainless smelting furnace.

Tables 5(1) and 5(2) and Tables 6(1) and 6(2) show results of actual tests using a molten iron ladle, a molten steel ladle, and an RH degassing smelting furnace. A large effect was found since the corrosion speed of the metal-impregnated refractory product was small.

Commercial Applicability of the Present Invention

According to the metal-impregnated refractory product of the present invention, since pores contained in the refractory product are filled with a metal, high slag attack resistance, gas attack resistance, spalling resistance, and corrosion resistance can be obtained. Therefore, when this metal-impregnated refractory product is used in slag lines and the like of various types of metal smelting furnaces and molten metal vessels, the life of the furnace or vessel can be largely prolonged as a whole. In addition, maintenance cost can be largely reduced by using the metal-impregnated refractory product of the present invention, which would be subjected to possible significant damage by a stream of molten steel, such when used to form the tapping hole of a converter.

Especially when a porous material brick is formed by adding various types of cell controlling agent in a material body so as to control pores contained in the brick in a desired state, a metal can be impregnated more easily. By controlling pores in a desired state in this manner, a metal can be impregnated in a central portion of a large porous molded body to enable manufacture of a large metal-impregnated brick. Large metal-impregnated bricks can be used as linings in, e.g., a converter and a degassing furnace. In addition, large bricks can be used as a molten metal contact block of a ladle and the inner wall of a slag line. Furthermore, large bricks can be used in a portion of an apparatus subjected to a high-temperature atmosphere, such as a coal liquefying gas pipe.

By arbitrarily selecting pore control conditions and molten metal impregnation conditions (e.g., an applied pressure and a heating temperature), a metal-impregnated brick having a high impregnation amount can be obtained. Since the metal-impregnated brick having a high impregnation amount has various characteristics not found in conventional bricks, various types of structures can be constructed using good mechanical properties and workability. In addition, the metal-impregnated brick having a high impregnation amount can be used as a functional material as well as a structural material. For example, the brick can be used as an ultrasonic medium for transmitting an ultrasonic wave directly to a high-temperature molten product.

TABLE 1 (1)

| | | Examples | | | | | |
|---|---|---|---|---|---|---|---|
| | | 1 | 2 | 3 Particle size control | 4 | 5 | 6 Mixed with sawdust |
| (1) Particle size distribution (vol %) | 1 to 6 mm | 30 | 30 | 35 | 35 | 30 | 30 |
| | 1 to 0.15 mm | 30 | 35 | 35 | 40 | 30 | 30 |
| | 0.15 to 0.44 mm | 20 | 25 | 30 | 25 | 40 | 20 |
| | 0.44 mm or less | 20 | 10 | 0 | 0 | 0 | 20 |
| (2) Thermally volume-reducing particle amount (vol %) | | — | — | — | — | — | 5 |
| (3) Diameter (mm) | | — | — | — | — | — | 0.1 |
| (4) Burning or heat treatment temperature (°C.) | | 1750 | 1750 | 1750 | 1750 | 1750 | 1750 |
| (5) Apparent porosity (wt %) of base brick | | 13.5 | 15.8 | 29.6 | 22.3 | 19.5 | 19.4 |
| (6) Ratio (%) of cells having cell size of 10 to 3,000 μm | | 6 | 20 | 40 | 70 | 35 | 43 |
| (7) Average cell size (μm) | | 4 | 7 | 19 | 54 | 28 | 39 |
| (8) Impregnated metal | | Fe—18Cr | Fe—18Cr | Fe—18Cr | Fe—18Cr | Fe—18Cr | Fe—18Cr |
| (9) Molten metal temperature (C.°) | | 1670 | 1670 | 1670 | 1670 | 1670 | 1670 |
| (10) Impregnation pressure (gauge pressure kg/cm$^2$) | | 8 | 8 | 8 | 8 | 8 | 8 |
| (11) Degassing vacuum degree (Torr) | | 1 | 1 | 1 | 1 | 1 | 1 |
| (12) Impregnated amount (vol %) | | 9.3 | 11.9 | 27.1 | 19.6 | 15.7 | 15.6 |
| (13) Apparent porosity (vol %) | | 4.2 | 3.9 | 2.5 | 2.7 | 3.8 | 3.8 |
| (14) Filling ratio (%) | | 69 | 75 | 92 | 88 | 81 | 80 |
| (15) Porosity (vol %) after metal cut flow test (Held in argon gas atmosphere at 1,650° C. for four hours) | | 11.9 | 12.2 | 15.2 | 5.8 | 11.8 | 11.0 |
| (16) Filling ratio (%) after outflow | | 12 | 23 | 49 | 74 | 39 | 43 |
| (17) Erosion test results | (18) Corrosion ratio | 100 | 98 | 73 | 42 | 61 | 54 |
| | (19) Penetration ratio | 100 | 102 | 95 | 20 | 70 | 43 |
| (20) Critical radiation temperature (C.°) of radiation rapid heating test | | 800 | 800 | 900 | 850 | 850 | 850 |
| (21) oxidation rate (mm/hr) of impregnaed metal 1,400° C. × 20 hours in atmosphere | | 2.5 | 2.1 | 1.4 | 0.7 | 1.1 | 1.1 |

TABLE 1(2)

| | | 7 | 8 Mixed with sawdust | 9 | 10 Mixed with Fe—18Cr Metal Particles | 11 | 12 Mixed with Hemp | 13 Mixed with vinyl | Comparative Example 1 |
|---|---|---|---|---|---|---|---|---|---|
| (1) | | 30 | 30 | 30 | 30 | 30 | 30 | 30 | 30 |
| | | 30 | 30 | 30 | 30 | 30 | 30 | 20 | 30 |
| | | 20 | 20 | 20 | 30 | 20 | 20 | 20 | 20 |
| | | 20 | 20 | 20 | 20 | 20 | 20 | 30 (Containing 4% of cement) | 20 |
| (2) | | 30 | 50 | 60 | 10 | 20 | 20 | 20 | — |
| (3) | | 0.1 | 0.1 | 0.1 | 1 | 1 | 0.1 mm (Diameter) 5 mm (Length) | 0.02 mm (Diameter) 10 mm (Length) | — |
| (4) | | 1750 | 1750 | 1750 | 1750 (Reducted atmosphere) | 1750 (Reducted atmosphere) | 350 | 600 | 1750 |
| (5) | | 36.2 | 69.3 | 78.5 | 14.3 | 15.6 | 39.4 | 36.2 | 13.5 |
| (6) | | 84 | 91 | 95 | 15 | 40 | 69 | 59 | — |
| (7) | | 70 | 83 | 95 | 7 | 9 | 250 | 43 | — |
| (8) | | Fe—18Cr | Fe—18Cr | The experiment was impossible due to low strength | Fe—18Cr | Fe—18Cr | Fe—18Cr | Fe—18Cr | — |
| (9) | | 1670 | 1670 | | 1670 | 1670 | 1670 | 1670 | — |
| (10) | | 8 | 8 | | 8 | 8 | 8 | 8 | — |
| (11) | | 1 | 1 | | 1 | 1 | 1 | 1 | — |
| (12) | | 32.8 | 66.4 | | 20.4 | 31.5 | 36.9 | 32.8 | — |
| (13) | | 3.4 | 2.9 | | 3.9 | 4.1 | 2.5 | 3.4 | — |
| (14) | | 91 | 96 | | 84 | 88 | 94 | 91 | — |
| (15) | | 8.2 | 6.3 | | 11.0 | 8.4 | 13.2 | 12.7 | — |
| (16) | | 83 | 91 | | 55 | 76 | 66 | 65 | — |
| (17) | (18) | 38 | 69 | | 72 | 49 | 79 | 83 | 143 |
| | (19) | 15 | 13 | | 64 | 32 | 62 | 85 | 341 |
| (20) | | 1300 | >1400 | | 1200 | 1300 | 1350 | 1350 | 500 |
| (21) | | 0.7 | 0.5 | | 1.0 | 0.8 | 1.2 | 1.2 | — |

TABLE 2 (1)

| | | Alumina system material | | | | |
|---|---|---|---|---|---|---|
| | | Examples | | | | Comparative Example |
| | | 14 | 15 | 16 | 17 | 2 |
| (1) Particle size distribution (vol %) | 1 to 6 mm | 30 | 35 | 30 | 30 | 30 |
| | 1 to 0.15 mm | 30 | 35 | 30 | 30 | 30 |
| | 0.15 to 0.44 mm | 20 | 30 | 20 | 20 | 20 |
| | 0.44 mm or less | 20 | — | 20 | 20 | 20 |
| (2) thermally volume-reducing particle amount (apparent vol %) | | — | — | 30 (sawdust) | 10 (Fe—18Cr) | — |
| (3) Diameter (mm) | | — | — | 0.1 | 1 | — |
| (4) Burning or heat treatment temperature (°C.) | | 1700 | 1700 | 1700 | 1700 (Reduction atmosphere) | 1700 |
| (5) Apparent porosity (wt %) of matrix | | 14.2 | 32.4 | 37.9 | 17.5 | 14.2 |
| (6) Ratio (%) of cells having cell size of 10 to 3,000 μm | | 13 | 64 | 82 | 30 | — |
| (7) Average cell size (μm) | | 6 | 32 | 48 | 7 | — |
| (8) Impregnated metal | | Fe—18Cr | Fe—18Cr | Fe—18Cr | Fe—18Cr | — |
| (9) molten metal temperature (C.°) | | 1670 | 1670 | 1670 | 1670 | — |
| (10) Impregnation pressure (gauge pressure kg/cm$^2$) | | 8 | 8 | 8 | 8 | — |

TABLE 2 (1)-continued

| | Alumina system material | | | | |
|---|---|---|---|---|---|
| | Examples | | | | Comparative Example |
| | 14 | 15 | 16 | 17 | 2 |
| (11) Degassing vacuum degree (Torr) | 1 | 1 | 1 | 1 | — |
| (12) Impregnation amount (vol %) | 10.3 | 29.3 | 35.6 | 24.1 | — |
| (13) Apparent porosity (vol %) | 3.9 | 3.1 | 2.3 | 3.4 | — |
| (14) Filling ratio (%) | 725 | 90 | 94 | 88 | — |
| (15) Porosity (vol %) after test of metal outflow (Held in argon gas atmosphere at 1,650° C. for four hours) | 9.5 | 7.3 | 4.7 | 7.2 | — |
| (16) Filling ratio after test of metal outflow | 33 | 77 | 87 | 59 | — |
| (17) Erosion test results (18) Corrosion ratio | 100 | 64 | 45 | 78 | 135 |
| (19) Penetration ratio | 100 | 86 | 63 | 74 | 245 |
| (20) Critical radiation temperature (C.°) of radiation rapid heating test | 1150 | >1400 | >1400 | 1300 | 950 |
| (21) Oxidation rate (mm/h) of impregnated metal 1,400° C. × 20 hours in atmosphere | 2.7 | 1.0 | 0.6 | 1.2 | |

TABLE 2 (2)

| | Magnesia/chromia system material | | | | | | | | | |
|---|---|---|---|---|---|---|---|---|---|---|
| | Examples | | | | | | | | Comparative Example | |
| | 18 | | 19 | | 20 | | 21 | | 3 | |
| | $Cr_2O_3$ | MgO | $Cr_2O_3$ | MgO | $Cr_2O_3$ | MgO | $Cr_2O_3$ | MgO | $Cr_2O_3$ | MgO |
| (1) | 5 | 25 | 16 | 25 | 5 | 25 | 5 | 25 | 5 | 25 |
| | 15 | 15 | 20 | 15 | 15 | 15 | 15 | 15 | 15 | 15 |
| | 15 | 5 | 25 | 5 | 15 | 5 | 15 | 5 | 15 | 5 |
| | 20 | — | — | — | 20 | — | 20 | — | 20 | — |
| (2) | — | | — | | 30 (Sawdust) | | 10 (Fr—18Cr) | | — | |
| (3) | — | | — | | 0.1 | | 1 | | — | |
| (4) | 1850 | | 1850 | | 1850 | | 1700 (Argon atomoshere) | | 1850 | |
| (5) | 16.5 | | 23.5 | | 39.6 | | 18.1 | | 16.5 | |
| (6) | 40 | | 53 | | 88 | | 43 | | — | |
| (7) | 8 | | 12 | | 40 | | 9 | | — | |
| (8) | Fe—18Cr | | Fe—18Cr | | Fe—18Cr | | Fe—18Cr | | — | |
| (9) | 1670 | | 1670 | | 1670 | | 1670 | | — | |
| (10) | 8 | | 8 | | 8 | | 8 | | — | |
| (11) | 1 | | 1 | | 1 | | 1 | | — | |
| (12) | 14.7 | | 22.2 | | 38.9 | | 26.9 | | — | |
| (13) | 1.8 | | 1.3 | | 0.7 | | 1.2 | | — | |
| (14) | 89 | | 94 | | 98 | | 96 | | — | |
| (15) | 7.8 | | 8.9 | | 3.1 | | 6.3 | | — | |
| (16) | 53 | | 62 | | 92 | | 77 | | — | |
| (17) (18) | 100 | | 68 | | 35 | | 62 | | 183 | |
| (19) | 100 | | 83 | | 56 | | 71 | | 329 | |
| (20) | 800 | | 1350 | | >1400 | | 1400 | | 700 | |
| (21) | 0.8 | | 0.9 | | 0.3 | | 0.4 | | | |

TABLE 3 (1)

|  |  | Examples | | | | | |
| --- | --- | --- | --- | --- | --- | --- | --- |
|  |  | 26 | 27 | 28 | 29 | 30 | 31 |
| (1) Particle size distribution (vol %) | 1 to 6 mm | 35 | 35 | 35 | 35 | 35 | 35 |
|  | 1 to 0.15 mm | 35 | 35 | 35 | 35 | 35 | 35 |
|  | 0.15 to 0.44 mm | 30 | 30 | 30 | 30 | 30 | 30 |
|  | 0.44 mm or less | — | — | — | — | — | — |
| (2) Thermally volume-reducing particle amount (vol %) |  | — |  |  |  |  |  |
| (3) Diameter (mm) |  | — |  |  |  |  |  |
| (4) Burning or heat treatment temperature (°C.) |  | 1750 | 1750 | 1750 | 1750 | 1750 | 1750 |
| (5) Apparent porosity (wt %) of matrix |  | 29.6 | 29.6 | 29.6 | 29.6 | 29.6 | 29.6 |
| (6) Ratio (%) of cells having cell size of 10 to 3,000 μm |  | 40 | 40 | 40 | 40 | 40 | 40 |
| (7) Average cell size (μm) |  | 9 | 9 | 9 | 9 | 9 | 9 |
| (8) Impregnated metal |  | Fe—18Cr |  |  |  |  |  |
| (9) Molten metal temperature (C.°) |  | 1670 |  |  |  |  |  |
| (10) Impregnation pressure (gauge pressure kg/cm²) |  | 1 | 10 | 100 | 200 | 1 | 10 |
| (11) Degassing vacuum degree (Torr) |  | 100 | 100 | 100 | 100 | 1 | 1 |
| (12) Impregnation amount (vol %) |  | (Non-impregnated portion is present in central portion) |  |  |  |  |  |
| (13) Apparent porosity (vol %) |  |  |  |  |  |  |  |
| (14) Filling ratio (%) |  | 35 | 72 | 86 | 86 | 40 | 94 |

TABLE 3 (2)

|  | Examples | | | | | | Comparative Example |
| --- | --- | --- | --- | --- | --- | --- | --- |
|  | 32 | 33 | 34 | 35 | 36 | 37 | 5 |
| (1) | 35 | 35 | 35 | 35 | 35 | 35 | 35 |
|  | 35 | 35 | 35 | 35 | 35 | 35 | 35 |
|  | 30 | 30 | 30 | 30 | 30 | 30 | 30 |
|  | — | — | — | — | — | — | — |
| (2) |  |  |  |  |  |  |  |
| (3) |  |  |  |  |  |  |  |
| (4) | 1750 | 1750 | 1750 | 1750 | 1750 | 1750 | 1750 |
| (5) | 29.6 | 29.6 | 29.6 | 29.6 | 29.6 | 29.6 | 29.6 |
| (6) | 40 | 40 | 40 | 40 | 40 | 40 | 40 |
| (7) | 9 |  | 9 | 9 | 9 | 9 | 9 |
| (8) |  |  |  |  |  |  |  |
| (9) |  |  |  |  |  |  |  |
| (10) | 100 | 200 | 1 | 10 | 100 | 200 | 100 |
| (11) |  | 1 | 0.1 | 0.1 | 0.1 | 0.1 | 200 |
| (12) |  |  |  |  |  |  | (Non-impregnated portion is present in central portion) |
| (13) |  |  |  |  |  |  |  |
| (14) | 99 | 99 | 40 | 94 | 99 | 99 | 30 |

TABLE 4 (1)

(Converter)

Magnesia system material
Examples

| | | 38 | 39 | 40 |
|---|---|---|---|---|
| (1) Particle size distribution (vol %) | 1 to 6 mm | 35 | 25 | 25 |
| | 1 to 0.15 mm | 35 | 30 | 30 |
| | 0.15 to 0.44 mm | 30 | 40 | 40 |
| | 0.44 mm or less | | 5 | 5 |
| (2) Thermal volume-reducing particle amount (vol %) | | | 15 | 25 |
| (3) Diameter (mm) | | | 0.5 | 0.5 |
| (4) Burning or heat treatment temperature (°C.) | | 1800 | 1800 | 1800 |
| (5) Apparent porosity (wt %) of base brick | | 27.3 | 36.2 | 47.8 |
| (6) Ratio (%) of cells having cell size of 10 to 3,000 μm | | 35 | 63 | 79 |
| (7) Average cell size (μm) | | 7 | 27 | 44 |
| (8) Impregnated metal | | Fe—18Cr—8Ni | 50Ni—50Cr | 50Ni—50Cr |
| (9) Molten metal temperature (C.°) | | 1500 | 1500 | 1500 |
| (10) Impregnation pressure (gauge pressure kg/cm²) | | 9 | 9 | 9 |
| (11) Degassing vacuum degree (Torr) | | 1 | 1 | 1 |
| (12) Impregnation amount (vol %) | | 26.6 | 35.6 | 46.6 |
| (13) Apparent porosity (vol %) | | 0.7 | 0.6 | 1.2 |
| (14) Filling ratio (%) | | 97 | 98 | 97 |
| (22) Actual machine test | (23) Converter wall (mm/h) | 0.4 | 0.2 | |
| | (24) Converter tap hole (the number of charge times) | | | 92 |
| | (25) Stainless smelting furnace wall (mm/h) | | 1.1 | |
| (26) Chemical composition | Mgo | 96 | 96 | 96 |
| | Cr₂O₃ | | | |
| | SiO₂ | 3 | 3 | 3 |
| | Al₂O₃ | | | |
| | CaO | 1 | 1 | 1 |

TABLE 4 (2)

(Converter)

| | Spinel system Material | | | Magnesia/chromia system material | | |
|---|---|---|---|---|---|---|
| | Examples | | | | | |
| | 41 | 42 | 43 | 44 | 45 | 46 |
| (1) | 35 | 25 | 25 | 30 | 20 | 20 |
| | 35 | 30 | 30 | 30 | 30 | 30 |
| | 30 | 40 | 40 | 20 | 30 | 30 |
| | | 5 | 5 | 10 | 20 | 20 |
| (2) | | 15 | 25 | | 15 | 20 |
| (3) | | 0.5 | 0.5 | | 0.5 | 0.5 |
| (4) | 1800 | 1800 | 1800 | 1850 | 1850 | 1850 |
| (5) | 28.2 | 38.3 | 49.2 | 21.3 | 34.6 | 42.1 |
| (6) | 42 | 70 | 88 | 63 | 84 | 92 |
| (7) | 9 | 39 | 64 | 23 | 79 | 126 |

TABLE 4 (2)-continued

| | | Spinel system Material (Converter) | | Magnesia/chromia system material | | |
|---|---|---|---|---|---|---|
| | | Examples | | | | |
| | | 41 | 42 | 43 | 44 | 45 | 46 |
| (8) | | Fe—18Cr—8Ni | Fe—18Cr—8Ni | Fe—18Cr—8Ni | Fe—18Cr—8Ni | Fe—18Cr—8Ni | Fe—18Cr—8Ni |
| (9) | | 1550 | 1550 | 1550 | 1550 | 1550 | 1550 |
| (10) | | 7 | 7 | 7 | 9 | 9 | 9 |
| (11) | | 0.1 | 0.1 | 0.1 | 0.1 | 0.1 | 0.1 |
| (12) | | 27.7 | 37.7 | 48.3 | 20.6 | 33.5 | 41.2 |
| (13) | | 0.5 | 0.6 | 0.9 | 0.7 | 1.1 | 0.9 |
| (14) | | 98 | 98 | 98 | 97 | 97 | 98 |
| (22) | (23) | 0.4 | 0.3 | | 0.5 | 0.4 | |
| | (24) | | | 56 | | | 88 |
| | (25) | | 0.4 | | | 0.3 | |
| (26) | | 29 | 29 | 29 | 53 | 53 | 53 |
| | | | | | 32 | 32 | 32 |
| | | 1 | 1 | 1 | 3 | 3 | 3 |
| | | 68 | 68 | 68 | 5 | 5 | 5 |

TABLE 4 (3)

| | | Magnesia/dolomite material (Converter) | | | Comparative Examples | |
|---|---|---|---|---|---|---|
| | | Examples | | | 6 MgO—C | 7 MgO—C |
| | | 47 | 48 | 49 | brick | brick |
| (1) | | 35 | 25 | 25 | MgO 76% | MgO 76% |
| | | 35 | 30 | 30 | C 19.6% | C 19.1% |
| | | 30 | 40 | 40 | | |
| | | | 5 | 5 | | |
| (2) | | | 15 | 25 | | |
| (3) | | | 0.5 | 0.5 | | |
| (4) | | 1800 | 1800 | 1800 | 300 | 1200 (Reduction atmosphere) |
| (5) | | 26.5 | 34.8 | 45.3 | 3.5 | 6.9 |
| (6) | | 32 | 59 | 72 | | |
| (7) | | 7 | 19 | 29 | | |
| (8) | | 50Ni—50Cr | 50Ni—50Cr | 50Ni—50Cr | | |
| (9) | | 1500 | 1500 | 1500 | | |
| (10) | | 25 | 25 | 25 | | |
| (11) | | 0.1 | 0.1 | 0.1 | | |
| (12) | | 26.2 | 34.7 | 45.0 | | |
| (13) | | 0.3 | 0.2 | 0.3 | | |
| (14) | | 99 | 99 | 99 | | |
| (22) | (23) | 0.3 | 0.2 | | 0.6 | |
| | (24) | | | 121 | | 40 |
| | (25) | | 0.8 | | 1.4 | |
| (26) | | 78 | 78 | 78 | 76 (C 19.6) | 76 (C 19.1) |
| | | 3 | 3 | 3 | | |
| | | 14 | 14 | 14 | | |

TABLE 5 (1)

|  |  | Alumina system material A ||| Alumina system material B |||
|---|---|---|---|---|---|---|---|
|  |  | Examples ||||||
|  |  | 50 | 51 | 52 | 53 | 54 | 55 |
| (1) Particle size distribution (vol %) | 1 to 6 mm | 30 | 30 | 30 | 30 | 10 | 10 |
|  | 1 to 0.15 mm | 35 | 20 | 20 | 30 | 20 | 20 |
|  | 0.15 to 0.44 mm | 30 | 30 | 30 | 40 | 40 | 40 |
|  | 0.44 mm or less | 5 | 20 | 20 |  | 20 | 20 |
| (2) Thermally volume-reducing particle amount (vol %) |  |  | 5 | 10 |  | 10 | 15 |
| (3) Diameter (mm) |  |  | 0.5 | 0.5 |  | 0.5 | 0.5 |
| (4) Burning or heat treatment temperature (°C.) |  | 1700 | 1700 | 1700 | 1650 | 1650 | 1650 |
| (5) Apparent porosity (wt %) of matrix |  | 23.1 | 19.5 | 24.6 | 19.3 | 21.6 | 27.8 |
| (6) Ratio (%) of cells having cell size of 10 to 3,000 μm |  | 60 | 55 | 74 | 72 | 59 | 83 |
| (7) Average cell size (μm) |  | 15 | 13 | 21 | 20 | 12 | 30 |
| (8) Impregnated metal |  | Fe-18Cr | Fe-18Cr | Fe-18Cr | Fe-18Cr | Fe-18Cr | Fe-18Cr |
| (9) Molten metal temperature (C.°) |  | 1600 | 1600 | 1600 | 1600 | 1600 | 1600 |
| (10) Impregnation pressure (gauge pressure kg/cm$^2$) |  | 10 | 10 | 10 | 10 | 10 | 10 |
| (11) Degassing vacuum degree (Torr) |  | 0.1 | 0.1 | 0.1 | 0.1 | 0.1 | 0.1 |
| (12) Impregnation amount (vol %) |  | 22.8 | 18.9 | 24.1 | 18.4 | 21.3 | 27.4 |
| (13) Apparent porosity (vol %) |  | 0.3 | 0.6 | 0.5 | 0.8 | 0.3 | 0.4 |
| (14) Filling ratio (%) |  | 99 | 97 | 98 | 95 | 99 | 99 |
| (15) Actual machine test Molten iron ladle wall (mm/h) |  | 0.3 | 0.2 | 0.2 | 0.4 | 0.4 | 0.3 |
| (16) Molten steel ladle slag line |  |  | 1.6 | 1.4 | 1.4 |  |  |
| (17) Molten steel ladle wall |  |  | 1.1 | 0.6 | 0.5 |  |  |
| (18) Molten steel ladel metal contact portion |  |  | 1.4 | 0.8 | 0.7 |  |  |
| (19) Chemical composition | Al$_2$O$_3$ (vol %) | 95 | 95 | 95 | 78 | 78 | 78 |
|  | Mgo |  |  |  |  |  |  |
|  | SiO$_2$ | 2 | 2 | 2 | 18 | 18 | 18 |

TABLE 5 (2)

|  | Magnesia system material ||| Spinel system material ||| Comparative Example 8 ||
|---|---|---|---|---|---|---|---|---|
|  | Examples |||||| Alumina ||
|  | 56 | 57 | 58 | 59 | 60 | 61 | brick | MgO—C |
| (1) | 30 | 20 | 30 | 30 | 20 | 20 |  |  |
|  | 30 | 30 | 30 | 30 | 30 | 30 |  |  |
|  | 30 | 30 | 30 | 30 | 30 | 30 |  |  |
|  | 10 | 20 | 20 | 10 | 20 | 20 |  |  |
| (2) |  | 5 | 10 |  | 5 | 10 |  |  |
| (3) |  | 0.5 | 0.5 |  | 0.5 | 0.5 |  |  |
| (4) | 1800 | 1800 | 1800 | 1800 | 1800 | 1800 | 1700 | 300 |
| (5) | 22.4 | 21.5 | 27.3 | 21.2 | 20.8 | 25.8 | 13.0 | 4.1 |
| (6) | 29 | 55 | 82 | 38 | 60 | 82 |  |  |
| (7) | 18 | 10 | 120 | 18 | 23 | 211 |  |  |
| (8) | Fe-18Cr | Fe-18Cr | Fe-18Cr | Fe-18Cr | Fe-18Cr | Ni |  |  |

TABLE 5 (2)-continued

| | | Magnesia system material | | | Spinel system material | | | Comparative Example 8 | |
|---|---|---|---|---|---|---|---|---|---|
| | | Examples | | | | | | Alumina brick | MgO—C |
| | | 56 | 57 | 58 | 59 | 60 | 61 | | |
| (9) | | 1600 | 1600 | 1600 | 1600 | 1600 | 1550 | | |
| (10) | | 10 | 10 | 10 | 10 | 10 | 15 | | |
| (11) | | 0.1 | 0.1 | 0.1 | 0.1 | 0.1 | 0.1 | | |
| (12) | | 21.9 | 20.9 | 26.9 | 20.5 | 20.5 | 25.1 | | |
| (13) | | 0.5 | 0.6 | 0.4 | 0.7 | 0.3 | 0.7 | | |
| (14) | | 98 | 97 | 99 | 97 | 99 | 99 | | |
| (22) | (23) | | | | 0.3 | 0.2 | 0.1 | 0.6 | |
| | (24) | 1.2 | 1.1 | 0.8 | 0.8 | 0.7 | 0.4 | | 2.2 |
| | (25) | 0.8 | 0.8 | 0.6 | 0.4 | 0.3 | 0.2 | 0.9 | |
| (26) | | 7.0 | 1.0 | 0.7 | 0.5 | 0.4 | 0.3 | 1.3 | |
| | | | | | | 70 | 70 | 90 | 93 |
| | | 92 | 92 | 92 | 24 | 24 | 24 | | 72 |
| | | 3 | 3 | 3 | 2 | 2 | 2 | 5 | |

TABLE 6 (1)

| | | Magnesia system material Examples | | |
|---|---|---|---|---|
| | | 62 | 63 | 64 |
| (1) Particle size distribution (vol %) | 1 to 6 mm | 30 | 20 | 20 |
| | 1 to 0.15 mm | 30 | 30 | 30 |
| | 0.15 to 0.44 mm | 30 | 30 | 30 |
| | 0.44 mm or less | 10 | 20 | 20 |
| (2) Thermally volume-reducing particle amount (vol %) | | | 5 | 10 |
| (3) Diameter (mm) | | | 0.5 | 0.5 |
| (4) Burning or heat treatment temperature (°C.) | | 1800 | 1800 | 1800 |
| (5) Apparent porosity (wt %) of matrix | | 22.4 | 21.5 | 27.3 |
| (6) Ratio (%) of cells having cell size of 10 to 3,000 μm | | 29 | 55 | 82 |
| (7) Average cell size (μm) | | 8 | 10 | 120 |
| (8) Impregnated metal | | Fe-18Cr-8Ni | Fe-18Cr-8Ni | Fe-18Cr-8Ni |
| (9) Molten metal temperature (C.°) | | 1100 | 1100 | 1100 |
| (10) Impregnation pressure (gauge pressure kg/cm²) | | 10 | 10 | 10 |
| (11) Degassing vacuum degree (Torr) | | 0.1 | 0.1 | 0.1 |
| (12) Impregnation amount (vol %) | | 21.9 | 20.9 | 26.9 |
| (13) Apparent porosity (vol %) | | 0.5 | 0.6 | 0.9 |
| (14) Filling ratio (%) | | 98 | 97 | 99 |
| (15) Actual machine test RH dipp tube (mm/n) | | 0.6 | 0.5 | 0.5 |
| (26) Chemical composition | MgO | 92 | 92 | 92 |
| | $Cr_2O_3$ | | | |
| | $SiO_2$ | 3 | 3 | 3 |
| | $Al_2O_3$ | | | |

TABLE 6 (2)

| | Spinel system material | | | Magnesia/chromia-system material | | | Comparative Example 9 Magnesia/chromia material |
|---|---|---|---|---|---|---|---|
| | Examples | | | | | | |
| | 65 | 66 | 67 | 68 | 69 | 70 | |
| (1) | 30 | 20 | 20 | 5 / 25 | 5 / 25 | 5 / 25 | |
|  | 30 | 30 | 30 | 15 / 15 | 15 / 15 | 15 / 15 | |
|  | 30 | 30 | 30 | 15 / 5 | 15 / 5 | 15 / 5 | |
|  | 10 | 20 | 20 | 20 | 20 | 20 | |
| (2) |  | 5 | 10 | — | 10 | 15 | |
| (3) |  | 0.5 | 0.5 |  | 0.5 | 0.5 | |
| (4) | 1800 | 1800 | 1800 | 1850 | 1850 | 1850 | |
| (5) | 21.2 | 20.8 | 25.8 | 23.5 | 34.9 | 39.8 | 15.3 |
| (6) | 38 | 60 | 82 | 53 | 192 | 258 | |
| (7) | 8 | 23 | 211 | 12 | 91 | 94 | |
| (8) | Fe—18Cr—8Ni | Fe—18Cr—8Ni | Fe—18Cr—8Ni | Fe—18Cr—8Ni | Fe—18Cr—8Ni | Fe—18Cr—8Ni | |
| (9) | 1100 | 1100 | 1100 | 1550 | 1550 | 1550 | |
| (10) | 10 | 10 | 10 | 9 | 9 | 9 | |
| (11) | 0.1 | 0.1 | 0.1 | 1 | 1 | 1 | |
| (12) | 20.5 | 20.5 | 25.1 | 22.2 | 34.0 | 39.1 | |
| (13) | 0.7 | 0.3 | 0.7 | 1.3 | 0.9 | 0.7 | |
| (14) | 97 | 99 | 97 | 94 | 97 | 98 | |
| (31) | 0.4 | 0.3 | 0.4 | 0.3 | 0.2 | 0.3 | 0.7 |
| (26) | 70 | 70 | 70 | 53.2 | 53.2 | 53.2 | 53.2 |
|  |  |  |  | 28.6 | 28.6 | 28.6 | 28.6 |
|  | 2 | 2 | 2 | 3.2 | 3.2 | 3.2 | 3.2 |
|  | 24 | 24 | 24 | 8.4 | 8.4 | 8.4 | 8.4 |

We claim:

1. A metal-impregnated refractory product used in direct or indirect contact with a molten material, said refractory product comprising a porous brick containing MgO as a main component and impregnated with at least one impregnating metal selected from the group consisting of iron, chromium and nickel or an impregnating alloy containing at least one of said metals, said porous brick prior to being impregnated having at least 4% by volume of open pores, and more than 25% of said open pores being impregnated with said metal or alloy, the pores being impregnated with said metal or alloy at a temperature of 1500° to 1670° C., wherein said porous brick is sintered and contains at least one component selected from the group consisting of CaO, $Cr_2O_3$, $Al_2O_3$, $ZrO_2$ and $SiO_2$, said molten metal being maintained within said refractory product even if said refractory product is subjected to a temperature high enough to cause said impregnated metal to be at least partially melted.

2. The metal-impregnated refractory product according to claim 1, wherein said porous brick prior to the metal impregnation contains more than 25 vol % of the open pores having a pore size of 10 to 3,000 μm.

3. The metal-impregnated refractory product according to claim 1, wherein said porous brick contains more than 5 to 20 vol. % of metal particles having a particle size of 30 to 10,000 μm, by mixing said metal particles with refractory powder prior to sintering and then sintering the resultant mixture, said metal particles being made of a metal which is the same as the impregnating metal.

4. The metal-impregnated refractory product according to claim 1, wherein said porous brick contains at least 40 wt. % of MgO and 5 to 20 vol. % of particles of a metal which is the same as the impregnating metal.

5. The metal-impregnated refractory product according to claim 1, wherein said metal consists essentially of austenitic stainless steel.

6. The metal-impregnated refractory product according to claim 1, wherein said impregnated alloy consists essentially of Fe-18Cr stainless steel or Fe-18Cr-8Ni stainless steel.

7. The metal-impregnated refractory product according to claim 1, wherein said impregnated alloy consists essentially of Ni-Cr alloy.

8. The metal-impregnated refractory product according to claim 1, wherein said impregnated alloy consists essentially of 50Ni-50Cr alloy.

9. The metal-impregnated refractory product according to claim 1, wherein said impregnating metal consists essentially of nickel.

10. A metal-impregnated refractory product used in direct or indirect contact with a molten material, said refractory product comprising a porous brick containing $Al_2O_3$ as a main component and impregnated with at least one impregnating metal selected from the group consisting of iron, chromium and nickel or an impregnating alloy containing at least one of said metals, said porous brick prior to being impregnated having at least 4% by volume of open pores, and more than 25% of said open pores being impregnated with said metal or alloy, the pores being impregnated with said metal or alloy at a temperature of 1500° C. to 1670° C., wherein said porous brick is sintered and contains at least one component selected from the group consisting of MgO, $ZrO_2$ and $SiO_2$, said molten metal being maintained within said refractory product even if said refractory product is subjected to a temperature high enough to cause said impregnated metal to be at least partially melted.

11. The metal-impregnated refractory product according to claim 10, wherein said porous brick contains more than 25 vol % of the open pores having a pore size of 10 to 3,000 μm.

12. The metal-impregnated refractory product according to claim 10, wherein said porous brick contains 5 to 20 vol % of metal particles having a particle size of 30 to 3,000 μm.

13. The metal-impregnated refractory product according to claim 10, wherein said porous brick contains at least 60 wt. % of $Al_2O_3$ and 5 to 20 vol. % of particles of a metal which is the same as the impregnating metal.

14. The metal-impregnated refractory product according to claim 10, wherein said porous brick contains 5 to 20 vol. % of metal particles having a particle size of 30 to 10,000 μm, by mixing said metal particles with refractory powder prior to sintering and then sintering the resultant mixture, said metal particles being the same metal as the impregnating metal.

15. The metal-impregnated refractory product according to claim 10, wherein said impregnated alloy consists essentially of austenitic stainless steel.

16. The metal-impregnated refractory product according to claim 10, wherein said impregnated alloy consists essentially of Fe-18Cr stainless steel or Fe-18Cr-8Ni stainless steel.

17. The metal-impregnated refractory product according to claim 10, wherein said impregnated alloy consists essentially of Ni-Cr alloy.

18. The metal-impregnated refractory product according to claim 10, wherein said impregnated alloy consists essentially of 50Ni-50Cr alloy.

19. The metal-impregnated refractory product according to claim 10, wherein said impregnating metal consists essentially of nickel.

20. A metal-impregnated refractory product used in direct or indirect contact with a molten material, said refractory product comprising a porous brick containing MgO as a main component and impregnated with at least one impregnating metal selected from the group consisting of iron, chromium and nickel or an impregnating alloy containing at least one of said metals, said porous brick prior to being impregnated having at least 4% by volume of open pores, and more than 25% of said open pores being impregnated with said metal or alloy, wherein said porous brick is sintered and contains at least one component selected from the group consisting of CaO, $Cr_2O_3$, $Al_2O_3$, $ZrO_2$ and $SiO_2$, said molten metal being maintained within said refractory product even if said refractory product is subjected to a temperature high enough to cause said impregnated metal to be at least partially melted.

21. A metal-impregnated refractory product used in direct or indirect contact with a molten material, said refractory product comprising a porous brick containing $Al_2O_3$ as a main component and impregnated with at least one impregnating metal selected from the group consisting of iron, chromium and nickel or an impregnating alloy containing at least one of said metals, said porous brick prior to being impregnated having at least 4% by volume of open pores, and more than 25% of said open pores being impregnated with said metal or alloy, wherein said porous brick is sintered and contains at least one component selected from the group consisting of MgO, $ZrO_2$ and $SiO_2$, said molten metal being maintained within said refractory product even if said refractory product is subjected to a temperature high enough to cause said impregnated metal to be at least partially melted.

* * * * *

UNITED STATES PATENT AND TRADEMARK OFFICE
CERTIFICATE OF CORRECTION

PATENT NO. : 5,523,150
DATED : June 4, 1996
INVENTOR(S) : NUMATA et al

It is certified that error appears in the above-identified patent and that said Letters Patent is hereby corrected as shown below:

Title Page, Left Column, under "Related U.S. Application Data", after "Aug. 12, 1991," insert --filed as PCT/JP90/00066, Jan. 20, 1990,--.

Signed and Sealed this

Twenty-first Day of July, 1998

*Attest:*

*Attesting Officer*

BRUCE LEHMAN

*Commissioner of Patents and Trademarks*